United States Patent [19]
Pottle

[11] 3,739,187
[45] June 12, 1973

[54] REMOTE SWITCHING SYSTEM

[75] Inventor: Arthur Richard Pottle, Cheshunt, England
[73] Assignee: AMP Incorporated, Harrisburg, Pa.

[22] Filed: Sept. 12, 1972
[21] Appl. No.: 288,445

[52] U.S. Cl. .................................... 307/29, 307/39
[51] Int. Cl. ............................................ H02j 3/00
[58] Field of Search ........................ 307/29, 39, 40; 340/310

[56] References Cited

UNITED STATES PATENTS

| | | | |
|---|---|---|---|
| 3,359,551 | 12/1967 | Dennison | 340/310 |
| 3,456,122 | 7/1969 | Hurd | 307/29 |

*Primary Examiner*—James D. Trammell
*Attorney*—William J. Keating et al.

[57] ABSTRACT

A remote switching system suitable for an automobile employs a power circuit supplied by the automobile battery and connected through electrical gates to loads such as lamps, windscreen wiper motor etc., the loads being associated with manual switches at the driving position, each of which when operated causes a unique binary signal to be emitted from an encoder, the bits of the binary signal being derived on different ones of parallel spaced conductors which transmit the binary signal to decoders associated respectively with the loads, one of the decoders reacting to a particular unique binary signal to open or close the associated electrical gate thus to connect or disconnect the load to or from the power circuit.

11 Claims, 2 Drawing Figures

REMOTE SWITCHING SYSTEM

This invention is concerned with remote switching systems and particularly to such a system suitable for installation in a motor car to control electrically operated devices distributed around the car from manual switches located at the driving position or otherwise remote from the electrically operated devices.

According to the present invention a switching system for a plurality of electrical loads comprises a power circuit connected to the loads through respective electrical gates operable between open and closed conditions to admit power to or shut off power from the loads, each gate being operatively associated with a respective control device connected to a signal transmission path leading from an encoder common to the control devices and operatively connected to switches associated respectively with the loads, the transmission path being in the form of a cable carrying several conductors fed with switch signals from the encoder which is arranged to generate different binary electrical signals in response to respective actuation of the switches, the binary signals being transmitted along the several conductors, each conductor transmitting a respective bit of the signal according to a high or low potential, the order of bits in the signal being defined by the relative positions of the several conductors which are arranged at the encoder and at the different control devices in predetermined pattern in spaced parallel relation, the control devices each being sensitive to a respective binary signal and adapted on receipt of such signal to reverse the state of the associated gate.

Figure 1:
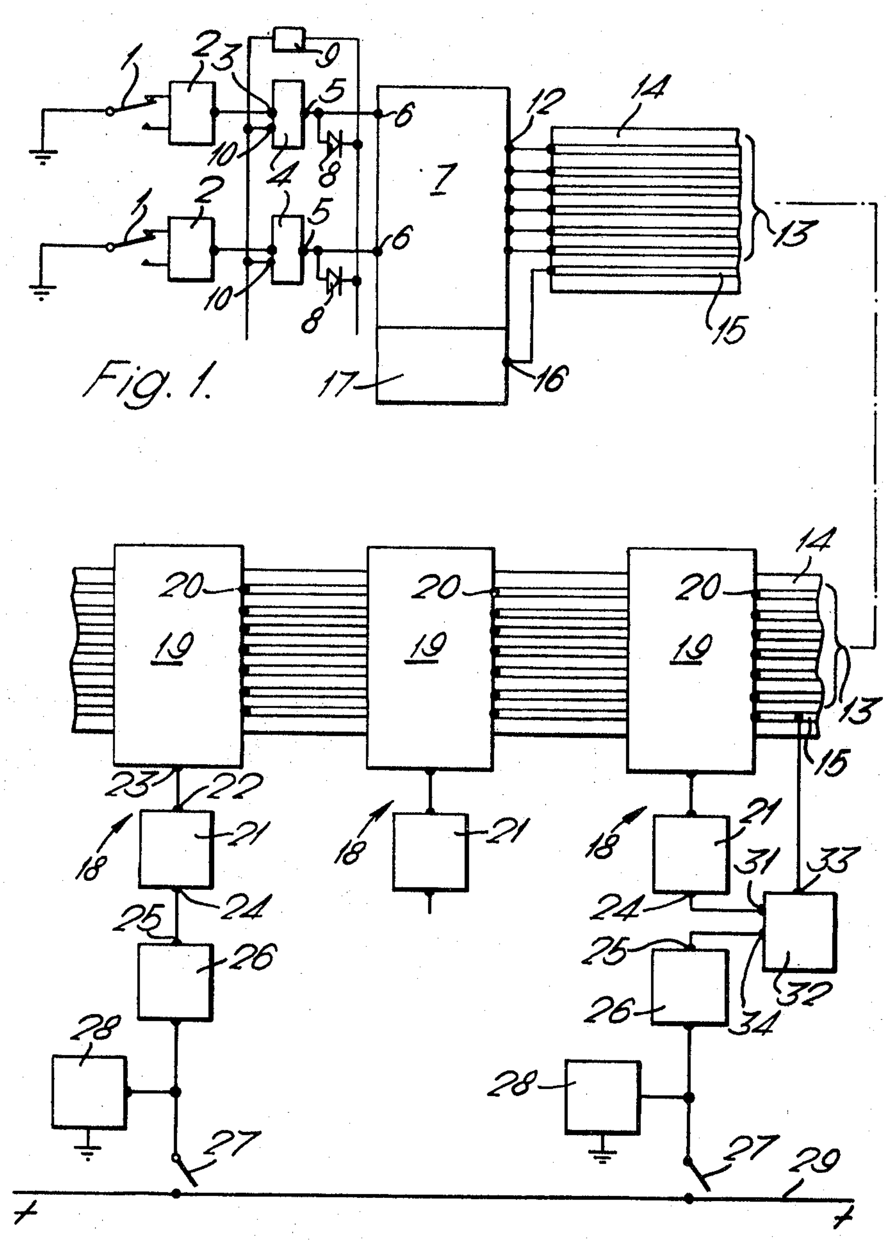
Figure 2:
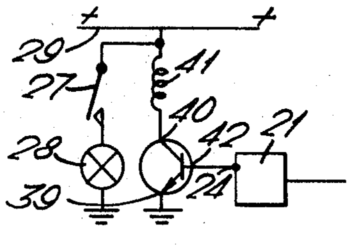

The invention will now be described, by way of example, with reference to the accompanying drawing in which:

FIG. 1 is a schematic diagram of a switching system according to the invention; and FIG. 2 is a circuit diagram showing a preferred form of electrical gate.

Manual signal switches 1, located on the dash-board of a motor car, are connected through respective crossed inverters 2 to the direct set inputs 3 of respective switch bistable memory devices 4. The outputs 5 of the bistable memory devices 4 are connected to respective input terminals 6 of an encoder 7. The bistable memory outputs 5 are also fed back by respective diodes 8 through a common delay unit 9 to the reset inputs 10 of the bistable memory devices 4.

The encoder 7 has six output terminals 12 connected to respective conductors 13 of a flat flexible cable 14 extending around the motor car, a seventh conductor 15 of the cable being connected to the output 16 of an oscillator 17. The cable 14 serves as a signal transmission path common to a plurality of control devices 18 (only three of which are shown) which are connected in parallel at spaced locations along the transmission path. Each control device includes a decoder 19, the input terminals 20 of which are connected to respective conductors 13. The circuitry of the control devices 18 is generally of the form shown at the end of cable 14 remote from the encoder 7 but differs for flasher and hazard warning devices as shown at the decoder 19 nearest the encoder 7.

The general form of control device comprises a decode or receive bistable memory device 21 to the direct set input 22 of which is connected the decode output 23. The output 24 of the bistable memory device 21 is fed to the input 25 of a relay gate 26 arranged to operate a switch 27 to connect or disconnect a load 28 to a power line 29 extending round the motor car and connected to the positive terminal of the car battery (not shown).

The flasher or hazard warning decoder output is also fed to a receive bistable memory device 21 but the output 24 of the bistable memory device 21 is fed to the direct set input 31 of a second bistable memory device 32 having a toggle input 33 supplied with oscillator signals from the conductor 15. The output 34 of the bistable memory device 32 is applied to a relay gate 26 arranged to operate a switch 27 at half the toggle input frequency to connect the load 28 in the form of flasher or hazard warning lamps to or disconnect from the power line 29.

The manual switches are suitably of the momentary contact type, that is that they are merely required to give a pulse contact and are not held on. The encoder 7 is protected against possible effects of contact bounce in the switches by virtue of the use of the crossed inverters 2.

In operation, when a manual switch is actuated, the associated switch bistable memory device 4 reverses its state from one in which no signal is fed to the encoder 7 to one in which a signal is fed to the encoder 7. The feed-back line through the delay unit 9 applies the output signal of the actuated bistable memory 4 to the reset inputs 10 of all the bistable memory devices 4, after a short interval, for example 50 microseconds. This short duration mitigates the risk of interference between the operation of different switches which might otherwise give a component input to the encoder 7.

The encoder 7 which receives the output signal of a bistable memory 3, is of the kind which is adapted on receipt of a signal at any one of its input terminals 6 to give signals at particular ones of the output terminals 12 to define across the output terminals a binary signal, the bits of which are defined at respective terminals, and which signal is unique to the particular input. Such units are commercially available as solid state digital keyboard encoders and are customarily used in keyboard controlled computor input devices. The encoder 7 may also embody means responsive to two or more simultaneous inputs to prevent the encoder giving a false output. Such means, generally referred to in calculator and typewriter applications as keyboard rollover protection, prevents an output when two or more manual switches are operated simultaneously or nearly simultaneously.

Each decoder 19 is adapted to give an output signal in response to a respective binary signal output from the encoder 7. Thus, one of the decoders 19 receives the binary signal from the encoder 7 and sets the associated receive bistable memory device 21 which in turn actuates the relay gate 26 to operate the switch 27 and carry out the desired operation (i.e. connect or disconnect the load 28 from the power line 29). When the same manual switch is again actuated the associated decoder 19 again gives an output signal in response to the binary signal output received from the encoder 7. The state of the output of the bistable memory device 21 is reversed which in turn deactuates the relay gate 26 to reverse the condition of switch 27.

If a switch 1 for the flasher or hazard warning is operated, the associated decoder 19 applies a direct set signal to the receive bistable memory device 21 which reverses its output signal corresponding to the input to the direct set input 31 of the second bistable memory 32 to allow the second bistable memory 32 to respond to the toggle input 33. The second bistable memory 32 generates an output at half the toggle input frequency to operate the gate relay 26 and open and close the flasher gate and operate the flasher lamps 35. On receipt of a second switch signal, the receive bistable memory 21 is reversed to apply a clamping signal to the direct set input 31 of the second bistable memory 32 to cut off its responses to the toggle input 33 and the generation of the oscillating output.

The flasher oscillator 17 is prefereably disposed adjacent the encoder 7 and continuously supplies an oscillating signal to the conductor 15 of the flat flexible cable 14. The toggle inputs 33 of the second bistable memory devices 32 of all the flasher and hazard warning devices on the motor car are connected to the conductor 15 so that synchronous operation results.

As shown in FIG. 2, each relay gate 26 comprises a switching transistor 38, the emitter 39 of which is connected to the motor car chassis, which acts as the electrical return path for the power line, and the collector 40 of which is connected to one end of a relay coil 41 the other end of which is connected to the power line 29. The base 42 of the transistor 38 is connected to the output 24 of the bistable memory 21. The switch 27 is a contact operable on energization of the relay coil 41 and is connected at one end to the power line 29 and at its other end to one side of the load 28 the other side of which is connected to the chassis.

The transistor 38 is so biased that it passes current only when the output of the bistable memory 21 is in one of its two states. When this is the case the relay coil 41 is energized so closing the switch 27 and connecting in the load 28. When the output state of the bistable memory 21 is reversed, the transistor no longer conducts, the relay coil is deenergized and the switch 27 opens to disconnect the load 28.

Instead of using a switching transistor and a relay, each electrical gate could be a power transistor in series with the load, the power transistor being biased to pass current only when the output of the bistable memory which is connected to a control electrode of the transistor is in a predetermined one of its two states. It should be noted, however, that currently available power transistors suffer a significant voltage drop when driven to the saturated condition and since the conventional battery and electrical components of a car have a common rated voltage, the voltage drop may lead to an unacceptable performance unless an uprated battery or derated components are used.

A suitable decoder 19 for a control device comprises means for supplying a combination of direct and inverted binary signals to an integrated circuit gate. Due to imperfect matching of components there may be variation in the delay in decoding various bits of the binary signal. To avoid false operation due to such variation, the decoding circuits may be synchronized by common clock pulses so that the decoder reads the switch signal during a short interval after the encoded binary signal has been generated. The short interval is determined so that the variation is accommodated within the interval and a stable signal is decoded.

Although a single transmission path was described, it may be desirable to have more than one transmission path or to have branches in a single main path to interconnect the various control devices and the encoder with economy, efficiency and convenience of layout.

It is noted that with a transmission path of a binary signal carrying conductors plus one additional conductor for operation of the flasher devices there are $2^n-1$ different binary signals which can be transmitted along the transmission path, i.e. $2^n-1$ different loads which can be switched. Thus with the 6 plus 1 conductor transmission path described $2^6-1$ equals 63 different loads can be switched.

The present invention has been described with reference to the automotive industry but the remote switching system is suitable for use in other fields, for example for installation in aircraft or ships.

I claim:

1. A switching system for a plurality of electrical loads, comprising a power circuit connected to the loads through respective electrical gates operable between open and closed conditions to admit power to or shut off power from the loads, each gate being operatively associated with a respective control device connected to a signal transmission path leading from an encoder common to the control devices and operatively connected to switches associated respectively with the loads, the transmission path being in the form of a cable carrying several conductors fed with switch signals from the encoder which is arranged to generate different binary electrical signals in response to respective actuation of the switches, the binary signals being transmitted along the several conductors, each conductor transmitting a respective bit of the signal according to a high or low potential, the order of bits in the signal being defined by the relative positions of the several conductors which are arranged at the encoder and at the different control devices in predetermined pattern in parallel spaced relation, the control devices each being sensitive to a respective binary signal and adapted on receipt of such signal to reverse the state of the associated gate.

2. A switching system as claimed in claim 1, in which a single transmission path is common to all or several of the control devices which are connected in parallel at spaced locations along the transmission path.

3. A switching system as claimed in claim 1, in which each transmission path is in the form of flat flexible cable.

4. A switching system as claimed in claim 1, in which at least one of the control devices comprises a decoder having inputs connected to respective conductors of the associated transmission path and an output connected to the input of a receive bistable memory device, the receive bistable memory device having an output connected to the input of a respective one of the electrical gates, the decoder being adapted to supply an output signal to the receive bistable memory device in response to a respective binary signal output from the encoder to reverse the state of the output of the receive bistable memory device which in turn reverses the condition of the electrical gate.

5. A switching system as claimed in claim 1, in which at least one of the control devices comprises a decoder having inputs connected to respective conductors of the associated transmission path and an output connected to the input of a receive bistable memory device, the receive bistable memory device having an output connected to a direct set input of a further receive bistable memory device which has a toggle input supplied by an oscillator, the further receive bistable memory device having an output connected to the input of a respective one of the electrical gates, the decoder being adapted to supply an output signal to the receive bistable memory device in response to a respective binary signal output from the encoder to reverse the state of the output of the receive bistable memory device, the further receive bistable memory device being adapted to emit at its output a series of pulses providing the input to the direct set input is at a predetermined state, the series of pulses causing repetitive opening and shutting of the electrical gate.

6. A switching system as claimed in claim 5, in which the oscillator supplies the toggle input of the further receive bistable memory device via an additional conductor on the cable.

7. A switching system as claimed in claim 1, in which at least one of the control devices comprises a decoder having inputs connected to respective conductors of the associated transmission path and an output connected to the input of a receive bistable memory device, the receive bistable memory device having an output connected to the control electrode of a power transistor connected in series between the associated load and the power circuit.

8. A switching system as claimed in claim 1, in which at least one of the control devices comprises a decoder having inputs connected to respective conductors of the associated transmission path and an output connected to the input of a receive bistable memory device, the receive bistable memory device having an output connected to the control electrode of a switching transistor connected in series between an associated relay coil and the power circuit, the relay coil having a switch contact in series between the associated load and the power circuit.

9. A switching system as claimed in claim 1, in which the switches are manually operated momentary contact switches connected respectively through crossed inverters to the direct set inputs of switch bistable memory devices the outputs of which are connected to respective inputs of the encoder.

10. A switching system as claimed in claim 9, in which a common time delay unit is connected between all the outputs of the switch bistable memory devices and reset inputs of all the switch bistable memory devices, whereby an input signal to the encoder has a predetermined duration.

11. A switching system as claimed in claim 1, in which the encoder includes means responsive to two or more simultaneous signals at its inputs to prevent the encoder giving a false output.

* * * * *

PO-1050
(5/69)

UNITED STATES PATENT OFFICE
CERTIFICATE OF CORRECTION

Patent No. 3,739,187 Dated June 12, 1973

Inventor(s) ARTHUR RICHARD POTTLE

It is certified that error appears in the above-identified patent and that said Letters Patent are hereby corrected as shown below:

On the title page in the heading, the Foreign Application Priority Data was left out and should read as follows:

Foreign Application Priority Data

September 23, 1971 Great Britain. . . . . . 44312/71

Signed and sealed this 11th day of June 1974.

(SEAL)
Attest:

EDWARD M.FLETCHER,JR.
Attesting Officer

C. MARSHALL DANN
Commissioner of Patents